INVENTOR.
ALBAN M. BOUDREAU
BY
*Blair & Buckles*
ATTORNEYS

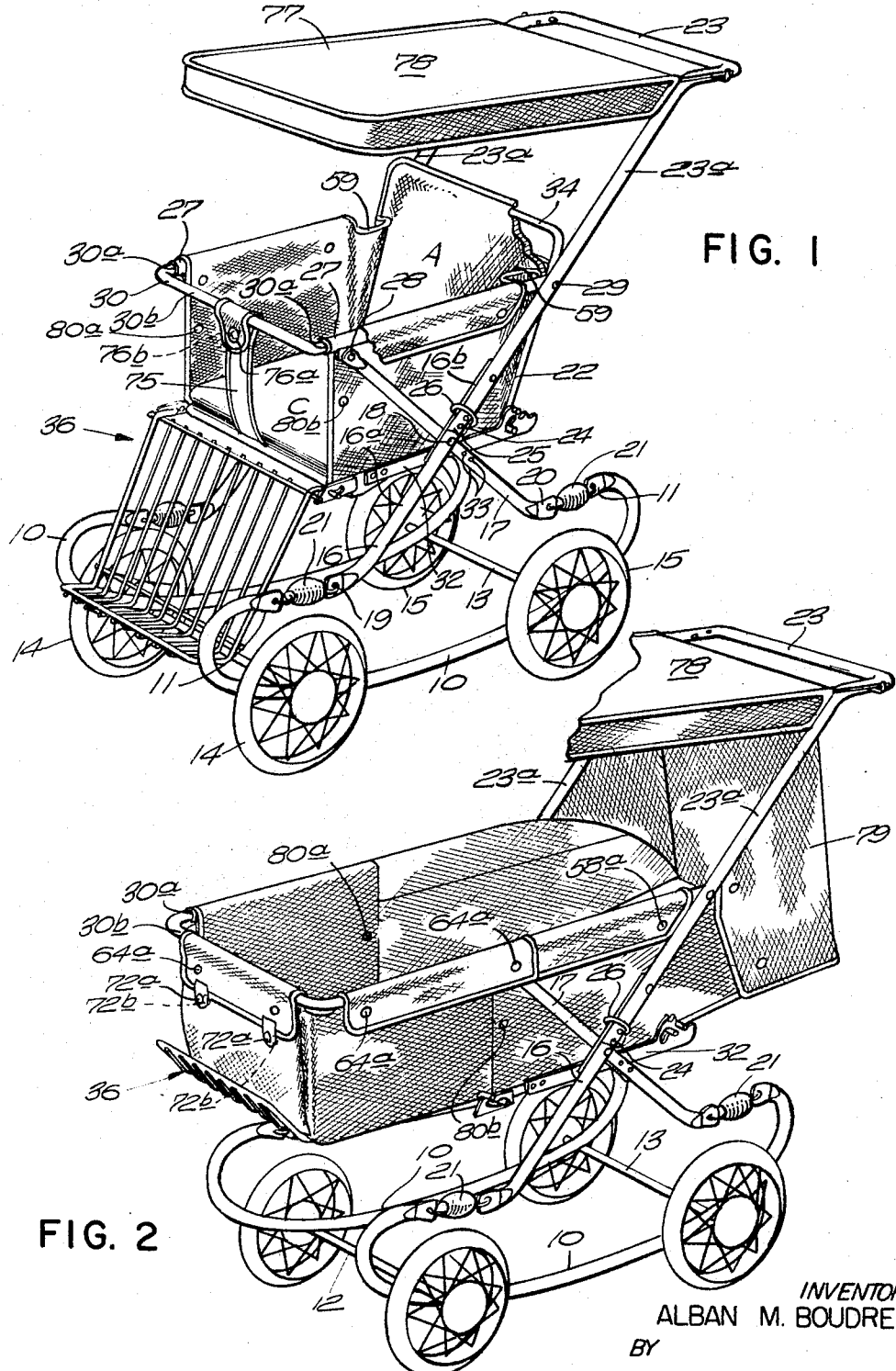

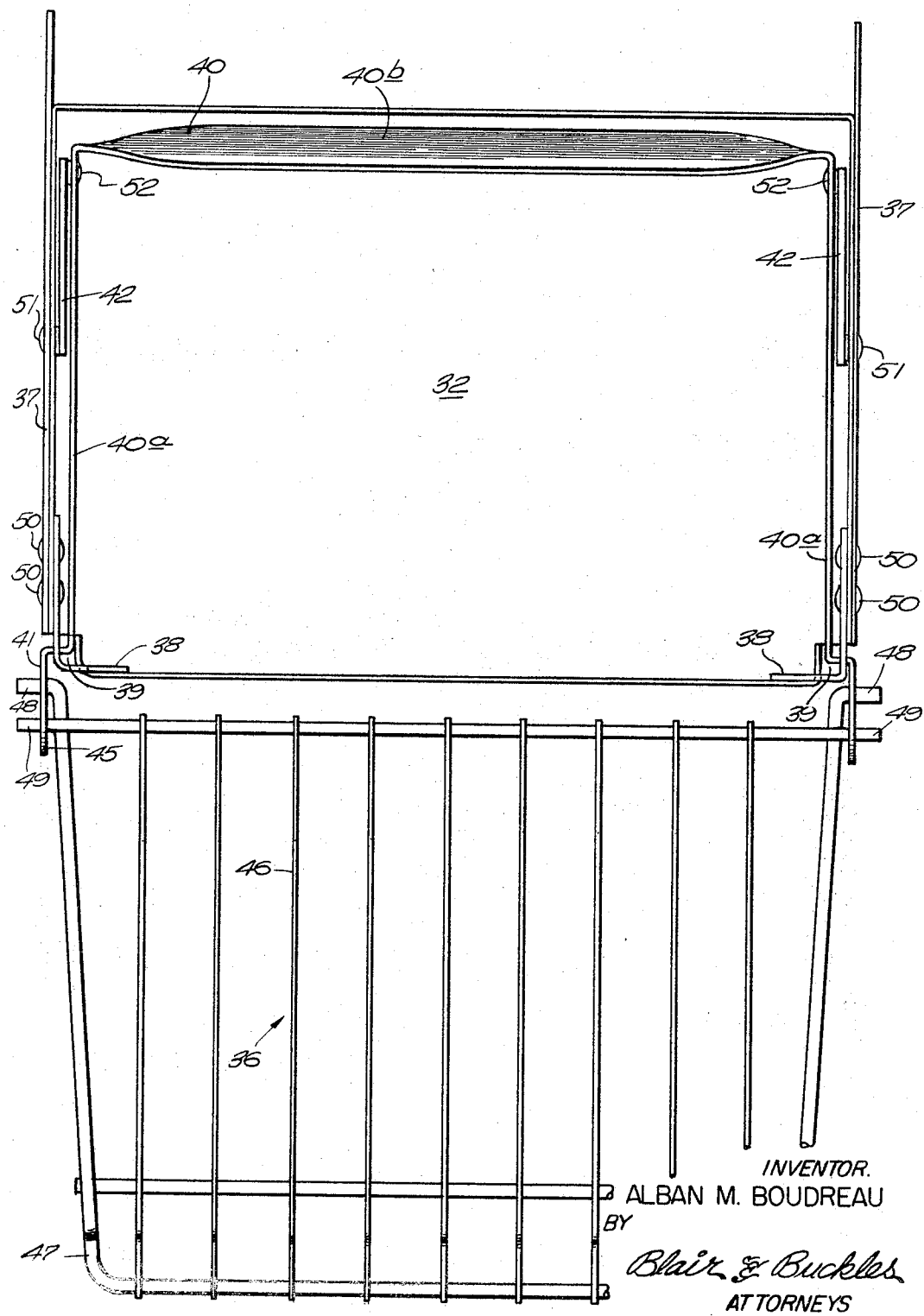

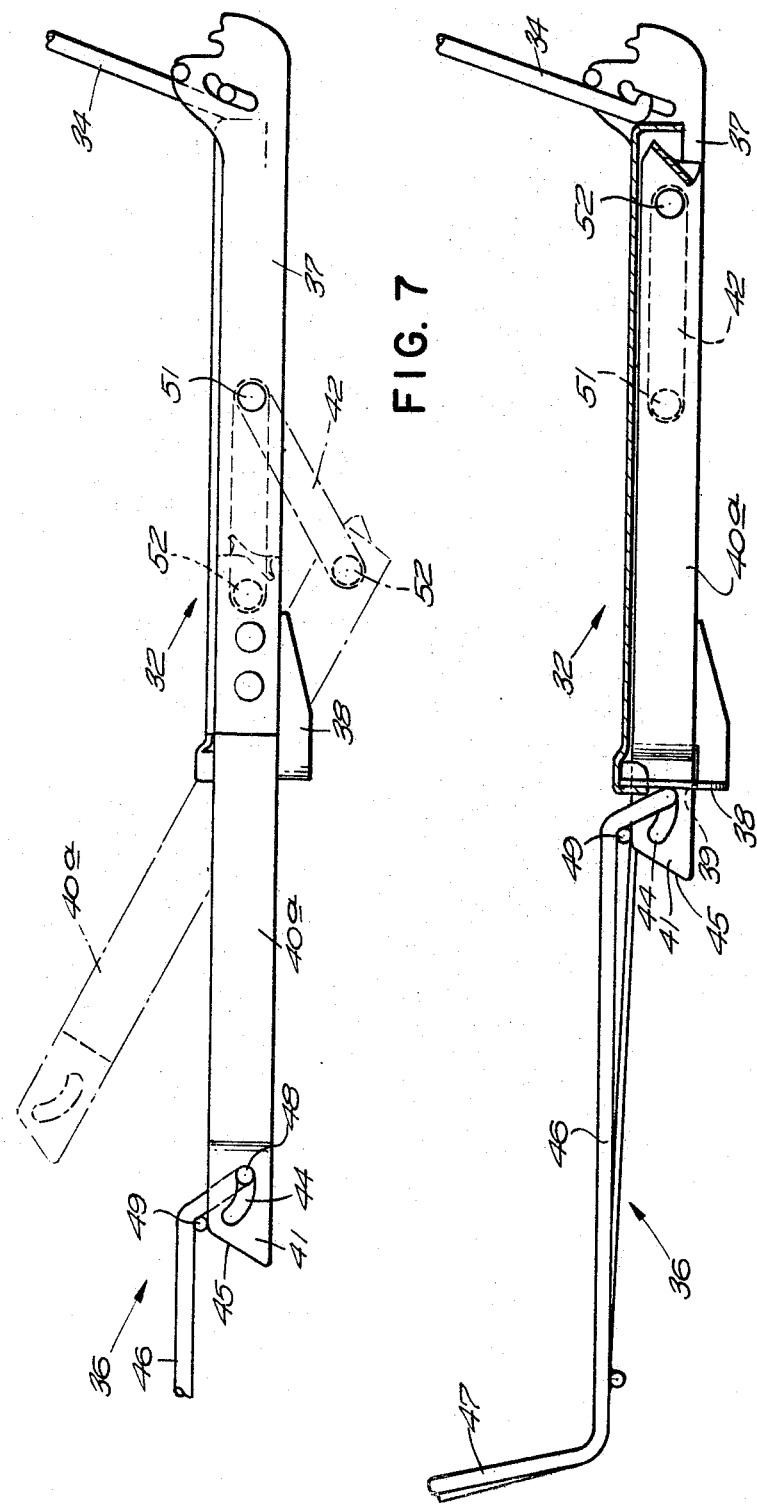

July 11, 1967

A. M. BOUDREAU 3,330,575

CONVERTIBLE AND FOLDABLE BABY VEHICLES

Filed Aug. 19, 1965

INVENTOR.
ALBAN M. BOUDREAU
BY

*Blair & Buckles*

ATTORNEYS

United States Patent Office 3,330,575
Patented July 11, 1967

3,330,575
CONVERTIBLE AND FOLDABLE BABY VEHICLES
Alban M. Boudreau, Gardner, Mass., assignor to
Hedstrom-Union Company, Fitchburg, Mass.
Filed Aug. 19, 1965, Ser. No. 480,938
4 Claims. (Cl. 280—36)

This invention relates to improvements in convertible and foldable baby vehicles. It relates more particularly to a baby vehicle which is convertible between a plurality of operative positions. In one position, the vehicle functions as a conventional open stroller in which the child sits erect. In the second operative position, it becomes a carriage for protectively enclosing a reclining child. The vehicle is also convertible to a third operative position in which the carriage is extended to accommodate an additional child in a sitting or reclining position, or to carry bundles, packages and the like. Of course, it is also collapsible or foldable for storage in the conventional manner.

Foldable baby vehicles which are convertible from a carriage to a stroller are not new. One such vehicle is shown in United States Letters Patent No. 2,872,203, owned by the assignee of the present application. Baby carriages having extensible bodies which "grow" with the child are also not new. However, heretofore these carriages have not functioned also as open strollers. One reason for this is the lack of a suitable footrest which is able to swing from a downwardly-forwardly stroller position to a horizontal carriage position, yet which is at the same time extensible and strong enough to support substantial weight in its extended position.

The aim of this invention is to add a third dimension to convertible carriage-strollers by enabling them to be extended so that they can safely accommodate a larger child or an additional child; or so that they can carry, in addition to the child, packages and other impedimenta that the mother would normally have to carry in her arms while pushing the carriage.

Another object of this invention is to provide a convertible baby carriage having a carriage body which can be increased materially in length.

Another object of this invention is to provide a baby vehicle having a footrest which is swingable from an inclined stroller position to a horizontal carriage position in which it can be extended to firmly support a carriage body having variable length.

A still further object of this invention is to provide a carriage having an extensible footrest which, when extended, can support a substantial weight.

Other objects of this invention wil lin part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 1 is a perspective view of a baby vehicle embodying the features of this invention, arranged to serve as a stroller;

FIG. 2 is a perspective view of the baby vehicle of FIG. 1 converted to an enclosed baby carriage;

FIG. 5 is a bottom plan view of the footrest portion of the baby vehicle of FIGS. 1–3 showing the footrest in its retracted position;

FIG. 6 is a vertical section of the portion shown in FIG. 5;

FIG. 7 is a side elevational view with parts cut away of the portion shown in FIG. 5, but with the footrest in its extended position and with a dotted line showing of its intermediate position.

Figure 3:
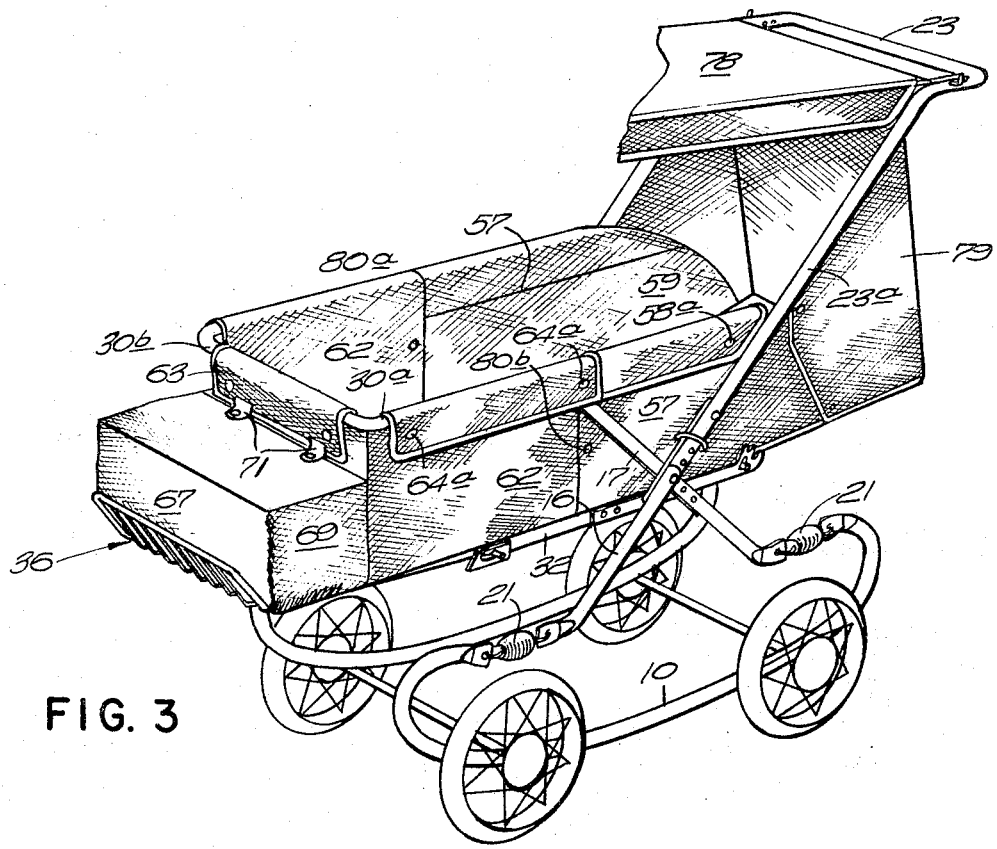
FIG. 3 is a similar perspective view of the same baby vehicle converted to an extended carriage capable of carrying two infants.

Briefly, my improved baby vehicle employs frame and body elements which are readily manipulable to permit the vehicle to be converted from a stroller to a carriage to an extended carriage. For this, the vehicle has the usual horizontal seating platform and backrest hinged thereto. A footrest structure is mounted from the seating platform. The footrest is articulated so that it can swing between a downwardly-forwardly inclined stroller position and an upper, substantially horizontal carriage position wherein it constitutes essentially an extension of the seating platform. Also, however, the footrest structure itself is pivotally and slidably converted to the seating platform so that it can be swung up and out relative to the platform to provide an elongated horizontal support for a similarly extended carriage body. When horizontal, in either its inner or extended position, it is held securely in place by the weight of the carriage body so that it provides a firm stable platform for the body.

The vehicle also has a fabric body comprising hinged-together forward and rear sections. The rear section normally covers the seating platform. The forward section occupies different positions depending on the operative position of the vehicle. When the vehicle is in its stroller position, the forward body section is folded back and serves as additional padding for the seat. When the vehicle is in its carriage positon, the forward body section rests on and covers the raised footrest. When the footrest is extended as aforesaid, the forward section of the carriage body folds out to the footrest. Thus, the same carriage can be made to accommodate a larger child or even two children at the same time. The improved swingable footrest structure is easily able to handle the added weight without extra suporting braces, struts, etc.

Refer to FIG. 1 of the drawings showing my improved baby vehicle in its stroller configuration. It comprises a pair of like, spaced-apart, rigid bottom frame elements 10 located at opposite sides and having opposite, upper inturned portions terminating in flattened ends 11. A pair of tranversely disposed front and rear axles 12 and 13, having corresponding front and rear wheels 14 and 15 at the opposite ends thereof, are secured to the frame elements 10, intermediate their ends. The baby vehicle also has duplicate side frames, each consisting of a pair of upstanding, crossed frame elements 16 and 17, pivotally connected at 18 intermediate their ends. Actually elements 16 are made up of lower tubular sections 16a and upper flat extensions 16b. The pivots 18 are located just below the upper ends of sections 16a. The frame elements 16 and 17 have flattened lower ends 19 and 20 respectively pivotally linked via springs 21 to adjacent ends 11 of the bottom frame elements 10.

The upper ends of extensions 16b are pivotally connected at 22 to the opposite arms 23a of a U-shaped, upwardly-rearwardly extending frame member 23 which functions as a pusher handle. The arms 23a extend beyond their respective pivot fastenings 22 down to the upper ends of the corresponding frame sections 16a. A wedge-shaped detent 24 projecting downwardly from the lower end of each arm 23a, is adapted to engage the corresponding frame section 16a through a slot 25 at the upper end thereof. The engagement of frame sections 16a by detents 24 stops the member 23 when its arms 23a are aligned with the frame elements 16. A slip ring 26 loosely fitted over each arm 23a is slid down so that it wedgingly engages over the corresponding detent 24. In this condition, the frame elements 16 functions as rigid extensions of the pusher handle 23. Also, by this, the springs 21 are tensioned so that they resiliently support the frame elements 16 and 17.

A pair of horizontal tubular side frame members 27 are located on opposite sides of the vehicle near the upper ends of frame elements 17. Each frame member 27 has its forward end pivotally connected at 28 to the upper end of the corresponding frame element 17 and its rear end pivotally connected at 29 to the corresponding arm 23a of handle member 23.

The forward ends of the side frame members 27 are open to accommodate telescopically the arms 30a of a tubular, U-shaped member 30. The member 30 can telescope between an inner position wherein its web 30b extends between the two members 27 at the forward ends thereof (as seen in FIG. 1) and an extended position wherein the web 30b is disposed substantially forwardly of members 27 (as seen in FIG. 2). Spring loaded pins (not shown) are provided at the forward ends of the side frame members 27 to engage the arms 30a and secure the member 30 in either of its two aforesaid positions.

Still referring to FIG. 1, a rigid seating platform indicated generally at 32 is supported between the two side frame elements 17 slightly below pivots 18. The platform 32 is rigidly secured at opposite sides thereof to the elements 17 by means of suitable rivets 33.

A backrest member 34 is hingedly mounted in the usual way to the rear edge of the seating platform 32. The member 34 is adjustable between a plurality of upper inclined positions and a lower horizontal position wherein it functions essentially as an extension of the seating platform 32.

A footrest indicated generally at 36 is hingedly mounted near the forward edge of the seating platform 32. The footrest 36 is swingable from a downwardly-forwardly inclined stroller position illustrated in FIG. 1 to an upper horizontal position illustrated in FIG. 2. In the upper position, the footrest 36 functions as an extension of the seating platform 32. In this position, it extends out forwardly of the seating platform 32 to a point approximately vertically below the web 30b of the frame member 30 when the latter is in its extended position of FIG. 2.

In accordance with the invention, this vehicle is convertible also to an extended carriage such as seen in FIG. 3. For this, the footrest 36 must be capable of extension an appreciable distance beyond its normal carriage position of FIG. 2 to create the additional platform area as described below. More particularly and referring to FIGS. 5, 6, and 8, the extensible footrest 36 is suspended by the seating platform 32. For this, the platform 32 includes opposite depending side members 37. These same side members are riveted to frame elements 17 to support the platform 32 as aforesaid. A bracket 38 is secured to each side member at the forward end thereof by rivets 50 (FIG. 5). Bracket 38 extends beyond the front of the platform 32 and is turned inward toward the center line of the vehicle. A slot 39 is formed in the inwardly turned part of each bracket 38.

A generally U-shaped frame member 40 having opposite U-arms 40a and a web 40b is arranged flat against the underside of seating platform 32 so that its U-arms 40a extend into the corresponding slots 39. Member 40 is constructed of heavy band iron and is quite rigid. The width of member 40 is slightly less than the distance between side members 37, while the length of its U-arms 40a are approximately the same as the length of the platform 32. Each U-arm 40a of member 40 is swingably connected to the corresponding side member 37 by means of a link 42. One end of each link 42 is pivotally converted at 51 to the corresponding side member 37. The other end of each link 42 is pivotally converted at 52 to the corresponding U-arms 40a of member 40. When the footrest 36 is in its retracted position as seen in FIGS. 5 and 6, the links 42 extend rearwardly from the side members 37 to the corresponding U-arms 40a, and the forward ends 41 of the U-arms 40a project out through slots 39.

Figure 8:
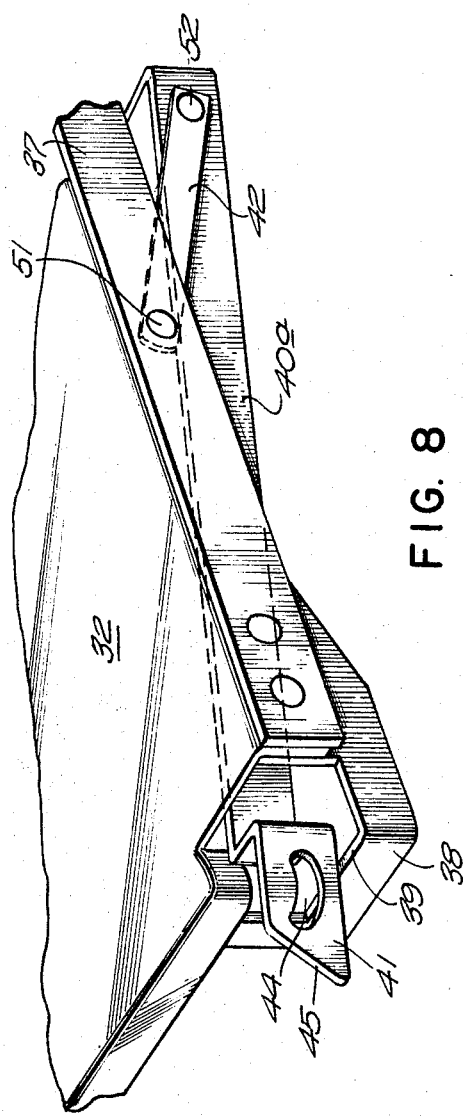
FIG. 8 is a perspective view on a larger scale of a portion of the structure shown in FIG. 6.

Still referring to FIG. 8, the forward ends 41 of the U-arms constitute the fixtures for mounting the footrest 36. Each fixture 41 has an upwardly turned crescent-shaped slot or opening 44 formed therein spaced back from its forward edge 45. Also, the forward edges 45 are similarly tapered to present downward inclines.

The footrest 36 itself comprises a main portion 46 and a smaller end position 47 arranged almost at right angles to portion 46. A pair of side extending lugs 48 extend out from the top of footrest portion 46. These lugs 48 fit into the corresponding openings 44 in fixtures 41 so that the footrest is swingable about the fixtures 41. Another pair of lugs 49 adjacent lugs 48 extend out sideways from footrest portion 46. Lugs 49 are arranged and adapted to overlie the forward edges 45 of the corresponding fixtures 41. When the lugs 48 are positioned at the rear ends of slots 44, the lugs 49 engage the fixtures 41 at the tops of edges 45 maintaining the footrest 36 in the horizontal carriage position (FIGS. 2 and 6). However, when the footrest 36 is lifted slightly and pulled forward so that the lugs 48 are made to occupy the forward end of the slots 44, the lugs 49 (and the footrest 36) are free to swing down until they again engage the fixtures 41 at points further down on edges 45. By this, the footrest is held at just the right downward angle with respect to the seating platform when the vehicle is converted to a stroller (FIG. 1).

Referring now to FIGS. 7 and 8, the U-shaped member 40 can be swung on the links 42 by pulling downwardly on the web 40b of member 40. The web 40b may be bent on its axis to facilitate grasping it. As the member 40 swings down, its U-arms 40a slide out through the slots 39. The extent of the sliding movement is, of course, determined by the length of links 42. At the same time, the forward ends 41 of U-arms 40a together with the footrest 36 swing up above the plane of the seating platform 32 to the dotted line position illustrated in FIG. 7. As the forward swinging movement of the member 40 continues, the arms 40a of member 40 and footrest 36 again return to the horizontal plane of the seating platform 32 with the web 40b of member 40 once more flush against the underside of the seating platform 32 as seen by the solid line showing in FIG. 7. It should be mentioned at this point that the length of links 42 should not be so great as to place the web 40b of the thus extended member 40 so close to the slots 39 in brackets 38 as to create an excessively large lever arm forwardlly of the slots 38. When the footrest 36 is thus extended, there is a small opening between the portions of U-arms 40a extending forward of seating platform 32. But this is not large enough to create any problem as far as support for the body is concerned. In any event, a plate (not shown) may extend between U-arms 40a to form a solid platform if desired. Of course, the inboard walls of slots 44 would be slit to accommodate such a plate. The retraction of the footrest 36 is, of course, accomplished in much the same way by pulling down and back on the web 40b of member 40.

It will be appreciated that when the member 40 is in either one of its two stable positions illustrated in FIGS. 6 and 7, it is held securely in place. For in both of these positions, the weight of the footrest 36 (and any load thereon) tends to push the web 40b of member 40 up against the underside of the seating platform 32. As a result, member 40 cannot accidentally slip out of position with possible injury to the child. Moreover, merely pulling or pushing on the footrest 36 itself, as a child might do, cannot suffice to move the member 40 out of either of its two operative positions. This is because the web 40b of member 40 must first be pulled down away from the seating platform 32 from below before such extension or retraction can take place. The extensible footrest constructed in accordance with this invention provides an exceptionally strong and stable platform for supporting a carriage body. Yet the footrest 36 can still comprise a light weight, well-appearing structure requiring no braces, struts or the like to help support its forward end.

Figure 4:
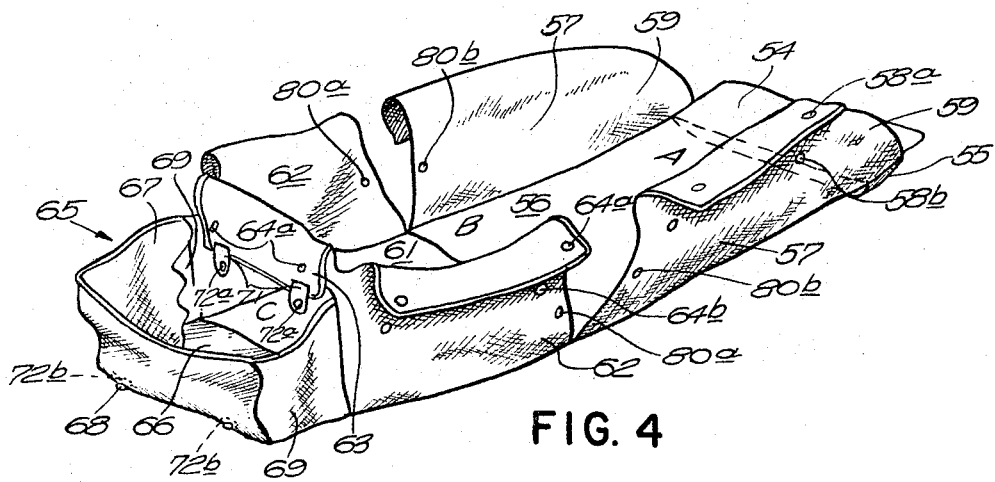
FIG. 4 is a perspective view of the fabric body on the baby vehicle of FIGS. 1–3.

Referring now to FIG. 4, the vehicle body specifically illustrated herein comprises three hinged-together sections A, B, and C. Section A functions as a cover and padding member for the backrest 34. Section A consists of a padded portion 54 and a horizontal flap 55 extending across the back of portion 54 at the top thereof. Flap 55 is adapted to engage over the backrest member 34. Section B covers and pads the seating platform 32. Section B has, in addition to a bottom wall 56, a pair of flexible side walls 57 which are adapted to extend up and engage over the side frame members 27 at the opposite sides of the vehicle. Mating snap fastener elements 58a and 58b are provided to secure the walls 57 in place around members 27. Each side wall 57 has a rearward extension 59 which connects with portion 54 of section A. Extensions 59 help to enclose the sides of the vehicle adjacent the backrest 34 when the backrest is in its lower position (FIG. 2). Body section C comprises a bottom wall 61, a pair of flexible side walls 62 and a forward wall 63. These walls are all fitted with mating snap fastener elements 64a and 64b to secure them over frame member 39 as will be described later.

In accordance with the invention, means are provided for extending the vehicle body to give it considerable added length. More particularly, a deep folding baglike extension indicated generally at 65 is provided in the forward body wall 63. The extension 65 comprises a padded bottom wall 66 hinged to the body bottom wall 61. It also includes a flexible top wall 67 connected at one end to the forward body 63 just below the snap fastener elements 64b. The other end of wall 67 is connected to the forward end 68 of bottom wall 66. A pair of similar flexible side walls 69 connected between the corresponding sides of wall 66, 67 and 63 complete the bag extension 65.

It will be appreciated that the extension 65 can be folded up simply by swinging up the bottom wall 66 toward forward wall 63 while at the same time folding the top and side walls 66 and 67 respectively in on top of bottom wall 66. The extension 65 may be secured in its folded position with wall 66 pressed tightly against the forward body wall 63 by means of tabs 71. These tabs 71 have suitable snap fastener elements 72a which are adapted to mate with corresponding fastener elements 72b on the under side of bottom wall 66 (FIG. 2).

As mentioned previously, when the vehicle is converted to function as a stroller (as in FIG. 1), the footrest 36 is down and the forward body section C, including the bag extension 65, is folded back on section B. In this, section C may lie either on top of or under section B. A crotch strap 75 secured to the forward edge of bottom wall 61 extends up and over the web 30b of frame 30. It is held there by suitable mating fastener elements 76a and 76b. Also a conventional canopy 77 is removably mounted at the upper portions of arms 23a of handle member 23. The canopy 77 includes a top portion 78 and a depending rear curtain 79 (FIG. 2). When the vehicle is converted to a stroller, the rear curtain 79 is tucked inside the usual pocket in the canopy portion 78.

When it is desired to convert the stroller of FIG. 1 to the carriage of FIG. 2, the footrest 36 is swung up to its horizontal position. Then the crotch strap 75 is detached from the U-shaped member 30 which is telescoped out to its extended position. Next, the forward body section C is folded out onto the footrest 36, its side wall 62 and forward wall 63 being turned up and engaged over the U-arms 30a and web 30b respectively of member 30. Additional snap fastener elements 80a and 80b may be provided on the adjacent edges of walls 57 and 62 to hold those together. Finally, the backrest member 34 is lowered to its horizontal position and the canopy rear curtain 79 is removed from the pocket in canopy portion 78 and secured in place around and under backrest 34 in the usual manner.

Now, when it is desired to convert the carriage of FIG. 2 to the extended carriage of FIG. 3, the web 40b of member 40 is pulled down away from the seating platform 32 and swung forwardly and upwardly until it again rests against the under side of seating platform 32. This moves the U-arms 40a and the footrest 36 attached thereto a considerable distance forwardly of seating platform 32 thereby providing additional platform area. Then, the body extension 65 is opened to its fully extended condition by releasing the tabs 71. The extension bottom wall 66 swings down and is supported by the footrest 36 extended as aforesaid.

This extra space in the forward part of the carriage enables the carriage to accommodate an additional child without undue crowding. Alternatively, this extra space may be utilized to carry bundles and packages and the like. In either event, the carriage extension is firmly supported from below by the footrest 36 and is able to carry substantial additional weight. Moreover, this is accomplished without any unsightly braces or struts at the forward part of the baby vehicle.

The convertible baby vehicle disclosed herein may be folded in the usual way by sliding the slip rings 26 off the detents 24. The pusher handle 23 may then be swung forward about pivots 22 to collapse or fold the vehicle downwardly, the backrest member 34 being unlatched for folding inward upon the seating platform 32.

It will be appreciated from the foregoing that the gear or frame portion of my improved three-way baby vehicle may be used with other types of fabric bodies. For example, the stroller body and carriage bodies may be entirely separate. In this event, the stroller body could be substantially like that shown in FIG. 1 minus the folded back body section C. The separate carriage body would look substantially like that shown in FIG. 2, only it would be a unitary structure much like a car bed. Of course, the carriage body would also have the forward extension described above. To convert this embodiment from a stroller to a carriage, the stroller body is first removed from the frame and then replaced by the carriage body. The carriage body is dropped down between the side frames 27 and aft of the extended frame member 30. It is firmly supported by the seating platform 32, and the raised footrest 36. In this embodiment of my invention, the carriage is extended to its full length exactly as described previously by manipulating member 40 and releasing the carriage body extension 65.

In another modified form of my invention, the body section C may be separate from sections A and B. When the vehicle is converted to function as a stroller, section C is removed and put away. To convert the vehicle to a carriage or an extended carriage, one simply places body section C on the raised footrest 36 and engages the side and front walls of section C over the extended member 30 exactly as described above.

It will thus be seen that the objects set forth above, among those made apparent from the preceding description are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all state- Having described my invention, what I claim as new and desire to secure by Letters Patent is:

1. A convertible baby vehicle comprising an upstanding frame, a seat supported by said frame, a pair of parallel arm rest members spaced above and at opposite sides of said seat, a U-shaped frame member positioned below said seat, said frame member having its opposite U-arms slidably connected to said seat near the forward edge thereof, a pair of links pivotally connected between said U-arms and the corresponding sides of said seat so that said frame member can swing between a first position wherein it lies in a generally horizontal plane with its U-arms substantially retracted under said seat and a second position wherein it lies in a horizontal plane with its U-arms extending an appreciable distance in front of said seat, a leg platform hingedly connected to the free ends of said U-arms, said platform being swingable between a downwardly inclined position and a substantially horizontal position, and means for maintaining said platform in its said horizontal position.

2. A convertible baby vehicle comprising an upstanding frame, a seating platform supported by said frame, means defining a pair of vertical slots at the opposite sides of said seating platform near the front thereof, a generally U-shaped frame member positioned under said platform, said frame member having its U-arms extending through said slots, a pair of links pivotally connected at one end to said platform at the opposite sides thereof aft of said slots and pivotally connected at the other end of the corresponding ones of said U-arms at points remote from the free ends thereof, a footrest hingedly connected to the free ends of said frame member, said frame member being capable of a combined swinging and sliding movement from a retracted position wherein it lies substantially under said seating platform and an extended position wherein its U-arms extend in front of said platform, the weight of said footrest and any load thereon tending to maintain said frame member in its said two positions.

3. A convertible baby vehicle comprising an upstanding frame, a seat supported by said frame, parallel arm rest members spaced above and at opposite sides of said seat, a U-shaped member having a web and opposite U-arms telescopically associated with said arm rest members, said U-shaped member being movable between an inner position wherein its web lies substantially directly above said seat and an extended position wherein its web lies appreciably forwardly of said seat, a footrest comprising hinged together front and rear sections, said rear section being slidably associated with said seat near the forward edge thereof, said rear section also being pivotally connected to said seat aft of its said forward edge so that said rear section is movable between an inner position wherein it is retracted under said seat and an extended position where it extends appreciably forwardly of said seat, said front footrest section being swingable between a downwardly-forwardly inclined position and a substantially horizontal position, means for maintaining said front footrest section in its said horizontal position, a vehicle body comprising front and rear sections for resting on said front footrest section and said seat respectively, said rear body section including a bottom wall and flexible upwardly extending side walls for engaging over said arm rest members, said front body section including a bottom wall and a pair of flexible upwardly extending side walls for engaging over said U-shaped member when that is in its said extended position, said front body section also including a leg extension comprising a bottom wall hinged to the forward edge of said first body section, an upwardly extending flexible front wall and a pair of upwardly extending flexible side walls, said extension side walls being connected also to said front body section, said extension bottom wall being foldable back against said front body section with said extension side and front walls folded between them to form a forward walls for said front body section when said footrest is in its said inner horizontal position, means for maintaining said extension bottom wall against said front body section, said extension bottom wall being also foldable out so as to overlie the forward portion of said footrest when that is in its horizontal extended position with said extension front and side walls opening out to form an enclosure, said front body section including said leg extension being foldable back on said seat when said U-shaped member is in its said inner position and said footrest is in its inner inclined position.

4. A convertible baby vehicle comprising an upstanding frame, a seat supported by said frame, parallel arm rest members spaced above and at opposite sides of said seat, a frame member slidably supported near the forward edge of said seat, means for swingably connecting said frame member to said seat rearwardly of its said forward edge so that said frame member can swing between a first position wherein it lies in a horizontal plane predominantly under said seat and a second position wherein it lies in a horizontal plane predominantly forwardly of said seat, a footrest extending substantially the entire width of said seat, means for pivotally connecting said footrest to the forward end of said frame member, said footrest being swingable between a stroller position wherein it extends downwardly and forwardly relative to said seat when said frame member is in its said first position and a carriage position wherein it lies in a horizontal plane forwardly of said seat, and a vehicle body having a first setcion for resting on said seat and a second section for resting on said footrest when said frame member is in its said second position, said second body section having its front end extensible from a first position thereof wherein it terminates at the forward end of said footrest when said frame member is in its said first position to a second position wherein it terminates at the forward end of said footrest when said frame member is in its said second position, said second body section being removable from said footrest when that is in its said stroller position.

References Cited

UNITED STATES PATENTS

| | | | |
|---|---|---|---|
| 2,278,078 | 3/1942 | Kahn | 297—435 |
| 2,872,203 | 2/1959 | Hedstrom | 280—41 |
| 2,967,059 | 1/1961 | Goldberg | 280—31 |
| 2,982,562 | 5/1961 | Gladstein | 280—36 |
| 3,072,437 | 1/1963 | Shea et al. | 297—435 |

BENJAMIN HERSH, *Primary Examiner.*

L. D. MORRIS, *Assistant Examiner.*